United States Patent Office 3,717,611
Patented Feb. 20, 1973

3,717,611
PHENOL ETHERS AND PHENOL ESTERS
AS STABILIZERS
Wilhelm Baumer, Wolfgang Fruhstorfer, Reiner Hesse, Manfred Engelhardt, and Bernd Dennler, Darmstadt, Germany, assignors to Merck Patent Gesellschaft mit beschrankter Haftung, Darmstadt, Germany
No Drawing. Filed May 5, 1970, Ser. No. 34,906
Claims priority, application Germany, May 5, 1969, P 19 22 815.0
Int. Cl. C08f 45/58; C08g 51/58
U.S. Cl. 260—45.95 G    15 Claims

ABSTRACT OF THE DISCLOSURE 2,6-di-tert.-butyl-phenol ethers and esters of the formula

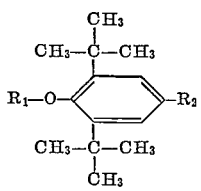

wherein $R_1$ is substituted or unsubstituted alkyl, alkenyl, aralkyl, or the acyl radical of an acid other than formic acid and $R_2$ is $R_1$ or H are stabilizers for plastics, oils and fats against thermal and/or oxidative degradation.

BACKGROUND OF THE INVENTION

This invention relates to stabilized polymeric compositions having 2,6-di-tert.-butyl-phenol ethers and esters as the stabilizer.

According to the generally accepted theory, which is well supported experimentally, as to the mechanism by which phenolic compounds act as stabilizers against the thermal or oxidative degradation of organic products, e.g., macromolecular synthetic materials, lubricants, oils and fats, which degradation takes place as a free-radical chain reaction, the vital step is the saturation of the chain-starting or chain-continuing free radicals with the H-atom of the phenolic OH-group, thus terminating the chain reaction because the thus-produced phenoxyl radical, which due to its resonance stabilization, is too low in energy to propagate the free radical chain reaction. Therefore, according to this theory, the stabilizing effect of compounds of this class is based on the presence of a phenolic OH-group in the stabilizer.

It has now been discovered that, surprisingly, the compounds of this invention, although they do not possess a phenolic OH-group, are nevertheless highly effective stabilizers against the thermal and/or oxidative degradation of such organic products.

SUMMARY OF THE INVENTION

According to this invention, plastics, oils and fats are stabilized by 2,6-di-tert.-butyl phenol ethers and esters of the formula

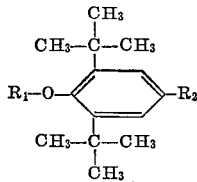

I wherein $R_1$ is straight-chain or branched alkyl or alkenyl of 1–22 carbon atoms, which can be unsubstituted, mono- or poly-substituted, i.e., with 0–6, preferably 0–2, by halogen, $NO_2$, CN and/or an epoxy group; or the corresponding alkyl and alkenyl groups in which one or more $CH_2$- and/or CH-groups in the carbon chain is substituted by O, S, CO, CS and/or N; or aralkyl of 7–20 carbon atoms, the alkyl portion of which can be saturated or unsaturated and can be mono- or polysubstituted by halogen, $NO_2$, CN and/or an epoxy group, and/or one or more of whose —$CH_2$- and/or CH-groups is substituted by O, S, CO, CS and/or N, and the aryl portion of which can be mono- or polysubstituted by halogen, $NH_2$, $NO_2$, CN, alkyl, alkoxy, acyl, acyloxy, alkylthio, alkylamino, dialkylamino, acylamino, or diacylamino; and $R_2$ is H or $R_1$, with the provision that $R_1$ is other than formyl.

OBJECTS OF THE INVENTION

It is an object of this invention to provide stabilizing agents for the stabilization of organic products containing one or more compounds of Formula I. It is another object to stabilize plastics and other synthetic materials, oils, and fats using as a stabilizer a compound of Formula I. A further object of this invention is to provide plastics and other synthetic materials, oils, or fats stabilized with at least one compound of Formula I. Other objects will be apparent to those skilled in the art to which this invention pertains.

DETAILED DISCUSSION

One aspect of this invention relates to novel phenol ethers and esters (II) having the Formula I wherein $R_2$ is a group other than H, methyl, ethyl, and tert.-butyl when $R_1$ is a methyl or ethyl and $R_2$ is a group other than H, methyl, tert.-butyl, and 2,6-dioxo-3,5-dioxaheptyl-(4) when $R_1$ is an acetyl group.

In the compounds of Formula I, $R_1$ and $R_2$ can be, for example, straight-chain or branched alkyl groups of 1 to 22 carbon atoms, e.g., methyl, ethyl, n- or isopropyl, n-, iso-, sec.- or tert.-butyl, n-amyl, isoamyl, neopentyl, hexyl, heptyl, octyl, nonyl, decyl, undecyl, dodecyl, tridecyl, tetradecyl, pentadecyl, hexadecyl, heptadecyl, octadecyl, as well as the isomers of these compounds and the higher homologs containing up to 22 carbon atoms.

$R_1$ and $R_2$ of Formula I can also be straight or branched chain alkenyl of 2–22 carbon atoms. The number of double bonds in the alkenyl group can vary from 1 to 21, i.e., all carbon-carbon links can be double bonds. In general, however, alkenyl groups with one or two isolated double bonds are preferred over those having conjugated or cumulated double bonds, e.g., allyl, 2- or 3-butenyl, 2-, 3- or 4-pentenyl, 2-, 3-, 4- or 5-hexenyl, 2,5-hexadienyl, methallyl, as well as the isomers of these groups, and the higher homologs thereof containing up to 22 carbon atoms.

The above-described alkyl and alkenyl groups can have one or more $CH_2$ and/or CH-groups substituted by O, S, CO, CS and/or N. However, in general, even in the longest-chain residues, no more than 6 $CH_2$- and/or CH-groups, and preferably 1, 2 or 3, are replaced by the aforementioned groups. If two or three $CH_2$ and/or CH-groups adjacent to each other are replaced by one or more of the aforementioned groups, the following combinations are to be taken into consideration: —S—S— (disulfides);

(hydrazines and substituted hydrazines); —CO—O— (carboxylic acids and esters thereof); —CO—N< (unsubstituted, mono- and disubstituted carboxylic acid amides); —CO—S— (thiocarboxylic acids and esters thereof);

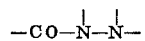

(carboxylic acid hydrazides); —CO—CO— (diketones); —CO—O—CO— (carboxylic acid anhydrides);

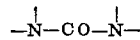

and

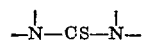

(derivatives of urea and thiourea). In no case, more than 4 adjacent groups are substituted. Among such heterosubstituted $R_1$- and $R_2$-groups, of special importance are those wherein the $CH_2$-group in the 1-position is substituted by CO. Preferred are acetyl, propionyl, butyryl, isobutyryl, valeroyl, isovaleroyl, trimethylacetyl, caproyl, caprinoyl, lauroyl, palmitoyl, stearoyl, acrylyl, methacrylyl, crotonyl, sorbinoyl, and oleyl. Examples of such groups which additionally contain one or more of —O—, —S—, —CO—, —CS— and —N< are: 3-methoxypropionyl, 3-octoxypropionyl, 3-dodecylthiopropionyl, 3-(2-methoxycarbonylethylthio)-propionyl, 3-(2-isobutoxycarbonylethylthio)-propionyl and 1,3,4-triaza-2-thionohexen-(4)-yl-(5).

It is also possible to substitute $CH_2$- and/or CH-groups in any other position by one or more of the above-enumerated groups. Examples are hydroxy- or amino-substituted groups in which $CH_2$ or CH of a $CH_3$-group is replaced by O and N, respectively, e.g., 2-hydroxyethyl, 2-aminoethyl, 2- or 3-hydroxypropyl, 2- or 3-aminopropyl, 2-, 3- or 4-hydroxybutyl, 2-, 3- or 4-aminobutyl, 1-hydroxy-2-propyl and 3-amino-2-butyl. With respect to those in which one or more secondary C-atoms bear an O- or N-atom, the following are of particular importance: 3-oxabutyl, 3- or 4-oxamyl, 4-methyl-3-oxamyl, 4,4-dimethyl-3-oxamyl, 3-, 4- or 5-oxahexyl, 3-, 4-, 5- or 6-oxaheptyl, 2-oxadecyl, 2-dimethylaminoethyl, 3-azabutyl, 2-diethylaminopropyl, 3-ethylaminopentyl, 3-methyl-3-azahexyl, 2-hydroxy-4,7,10-trioxaundecyl, 2-hydroxy-4-oxahexadecyl, 3,6-dioxaheptyl, as well as the isomers of these groups and the higher homologs thereof derived from alkyl or alkenyl residues containing up to 22 carbon atoms, especially those of the formula

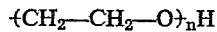

wherein $n$ is an integer from 1 to 7.

Of the above alkyl or alkenyl groups, of those wherein two or three adjacent $CH_2$- or CH-groups are substituted by the aforementioned groups, of particular importance are carboxylic acids and the functional derivatives thereof, e.g., esters, anhydrides, amides, and hydrazides. Examples of such groups are 2-carboxyethyl, 2-carbomethoxyethyl, carbomethoxymethyl, carbo-tert.-butoxymethyl, 2-carbamoylethyl, 2-carbo-octadecyloxyethyl, 2-acetoxyethyl, 2-carbamoylethyl, 3-carbethoxypropyl, as well as straight chain and branched higher homologs thereof and the corresponding groups containing additional hetero atoms, such as, for example, 1-carbethoxy-3-oxamyl-(2).

All of the above-described groups can be mono- or polysubstituted by halogen, especially by fluorine and/or chlorine, CN, $NO_2$ and/or the epoxy group. Preferred are those containing no more than three such substituents. Examples of such groups are 2-cyanoethyl, 2-chloroethyl, 2-fluoroethyl, 3-chloropropyl, 2- or 3-fluoropropyl, 3-cyanopropyl, 2,3-epoxypropyl, 2,3-epoxybutyl, 3- or 4-nitrobutyl, 4-chlorobutyl, chloroacetyl, dichloroacetyl, trichloroacetyl, and trifluoroacetyl.

Among the compounds of Formula I wherein $R_1$ and/or $R_2$ is an aralkyl group, of particular importance are those wherein the alkyl portion is straight-chain and is unsubstituted or contains 0 to 2 double bonds and 0 to 3 of O, S, N and/or CO in the chain and wherein the aryl portion is unsubstituted phenyl or phenyl substituted by 1–3 of alkyl, alkoxy, alkylthio, halogen, $NO_2$, $NH_2$, CN, acyl, acyloxy, alkylamino, dialkylamino, acylamino and/or diacylamino. Examples of such aralkyl groups are benzyl, 1- or 2-phenylethyl, 3-phenylpropyl, 4-phenylbutyl, p-methoxybenzyl, 2-hydroxy-4-(2',6'-methylphenyl)-4-oxabutyl, 7-(2',6'-di-tert.-butyl-4'-methylphenyl)-7-oxaheptyl, 3,5-di-tert.-butylbenzyl, 4-acetoxy-3,5-di-tert.-butylbenzyl, 1,5-dioxo-3-thia-6-(2',6'-di-tert.-butyl-4'-methylphenyl)-6-oxahexyl, 1,6-dioxo-7-(2',6'-di-tert.-butyl-4'-methylphenyl)-7-oxaheptyl, 1,7-dioxo-4-thia-8-(2',6'-di-tert.-butyl-4'-methylphenyl)-8-oxaoctyl, 7-(2',6'-dimethyl-4'-aminophenyl)-1-oxo-4,7-dioxaheptyl.

In the definition of $R_1$ and $R_2$ in the preceding paragraph, alkyl and alkoxy in each instance preferably contains 1–8 and more preferably 1–4 carbon atoms, preferably methyl or ethyl, and acyl contains one to 12, preferably one to 8 carbon atoms, e.g., alkanoyl and carboxylic aryl preferably containing 1 or 2 separate or fused rings.

The term alkyl as used herein also embraces cycloalkyl, e.g., cyclopropyl, cyclobutyl, cyclopentyl, cyclohexyl and cycloheptyl.

Preferred classes of stabilizers of Formula I are those in which:

(a) One of $R_1$ and $R_2$ is alkyl, preferably $CH_3$;

(b) $R_1$ is alkyl substituted by a single double bond, a single epoxy group, one or more oxa groups, each separated by an ethylene bridge, an $\alpha$-phenyl group, unsubstituted or ring substituted, or p-methyl-o,o'-di-tert.-butylphenoxy;

(c) Compounds as defined by (b) wherein $R_2$ is $CH_3$;

(d) $R_1$ is an acyl group, preferably acetyl, in which the carbonyl substituent is lower-alkyl, phenyl or styryl in which the phenyl ring is unsubstituted or substituted, e.g., with a lower-alkoxy, for example, p-lower-alkoxy-3,5-di-tert.-butyl, or in which the carbonyl substituent is alkyl bearing one or more thia, oxa and oxo groups;

(e) Compounds as defined by (d) wherein $R_2$ is $CH_3$;

(f) $R_2$ is ethylene substituted in the $\beta$-position, e.g., with cyano, carbamyl, acetyl or carboalkoxy;

(g) Compounds as defined by (f) wherein $R_1$ is $CH_3$;

(h) $R_2$ is an acyl group in which the carbonyl substituent is lower-alkyl, phenyl or styryl in which the phenyl ring is unsubstituted or substituted, e.g., with a lower-alkoxy, for example, p-lower-alkoxy-3,5-di-tert.-butyl, or in which the carbonyl substituent is alkyl bearing one or more thia, oxa and oxo groups;

(i) Compounds as defined by (h) wherein $R_1$ is $CH_3$.

The stabilizing agents of this invention stabilize organic products from a wide variety of fields which are susceptible to degradation by oxygen and/or heat.

Those susceptible to oxidative degradation generally fall into the class of compounds which contain non-conjugated unsaturation, e.g., vegetable oils and animal fats, and natural and synthetic rubbers and polyolefins, which contain terminal unsaturation. Such compounds absorb oxygen to form peroxides which can then decompose to initiate a free radical degradative reaction.

Products of particular importance are high-molecular synthetic materials, such as, for example polyolefins, particularly polymers of $\alpha$-olefins, e.g., low and high pressure polyethylenes and polypropylenes, polystyrenes, polyamides, polyesters, polyacetals, polyvinyl chloride, polyethers, copolymers of polyethylene/propylene; styrene/butadiene; butadiene/isobutylene; butadiene/acrylonitrile; natural rubber, synthetic rubbers, e.g., polyisoprene and polybutadiene; mineral oils, vegetable oils and fats, including mono-, di- and triglycerides, unsaturated fatty acids and their esters, waxes, long-chain fatty alcohols and fatty acids, anti-friction compounds and lubricating fonic acid and isobutene. Suitable Lewis acids for this introduction of the tertiary butyl groups are, for example, sulfuric acid, phosphoric acid, boron trifluoride, boron trifluoride etherate, hydrogen fluoride, aluminum chloride, zinc chloride, iron (III) chloride, and titanium tetrachloride. Preferred are sulfuric acid, phosphoric acid, boron trifluoride, boron trifluoride etherate, and mixtures of these compounds. When the reaction is conducted in solution, suitable reaction solvents are, in particular, petroleum ether, carbon disulfide, chlorobenzene, nitrobenzene, and optionally also 1,2-dichloroethane or carbon tetrachloride. The selected reaction temperature depends in part, on the properties of the starting material and/or the Lewis acids added thereto. Such temperatures range usually between −30° C. and +150° C., preferably between 0° C. and 90° C. The reaction mixtures are worked up in a conventional manner, for example by pouring into water, extracting the reaction product with a solvent suitable for this purpose, e.g., petroleum ether, benzene, or ether, and optionally, after removal of this solvent, purifying the product, e.g., by recrystallization, distillation, or chromatography.

The novel compounds of this invention (II) can also be obtained by reacting a compound of Formula I wherein $R_2$ is hydrogen, in the presence of a Lewis acid, with a compound which is reactive under these conditions and introduces an $R_2$ group. Such compounds are, for example, alkyl or acyl halogenides, alkyl or dialkyl sulfates, acid anhydrides, and acid esters. The Lewis acids which can be employed, as well as the reaction conditions, correspond to those described above for the introduction of the tertiary butyl groups.

Finally, the novel compounds of this invention (II) can also be produced by functionally modifying one or both $R_1$ and $R_2$ groups of such a novel compound (II) in a conventional manner, for example, by halogenation, epoxidation of a double bond, saponification of a cyano group to the acid amide or to the carboxylic acid, saponification of an ester group to the carboxyl group, esterification or amidation of a carboxyl group, etherification of a hydroxy group, or alkylation or acylation of an amino group.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the following examples, all temperatures are set forth in degrees centigrade.

Example 1

25.8 g. of the potassium salt of 2,6-di-tert.-butyl-4-methylphenol (prepared by dissolving 2,6-di-tert-.butyl-4-methylphenol with a small excess of KOH in ethanol, evaporation, taking up the residue in toluene, and distilling off the toluene under a vacuum) is dissolved in 50 ml. of diethylene glycol dimethyl ether. To this solution is added 12.6 g. of dimethyl sulfate, and the reaction mixture is stirred for 2 hours at 40°. Thereafter, the mixture is poured into ice water and the thus-separated oil is taken up in petroleum ether. The extract is dried over sodium sulfate, the petroleum ether is distilled off, and the remaining 2,6-di-tert.-butyl-4-methylanisole is distilled under reduced pressure; B.P.$_{12}$ 134–137°.

Analogously, the following compounds are obtained:

2,6-di-tert.-butylanisole, B.P.$_9$ 124–126°
2,6-di-tert.-butyl-4-ethylanisole, B.P.$_{14}$ 151°
2,6-di-tert.-butyl-4-n-propylanisole, B.P.$_{0.4}$ 130–132°
2,4,6-tri-tert.-butylanisole, M.P. 106–108°
2,6-di-tert.-butyl-4-n-octylanisole, B.P.$_4$ 182–183°
2,6-di-tert.-butyl-4-dodecylanisole, B.P.$_5$ 220–222°
2,6-di-tert.-butyl-4-octadecylanisole, B.P.$_5$ 262–264°
2,6-di-tert.-butyl-4-methylphenetole, B.P.$_{12}$ 140–143°

Example 2

25.8 g. of the potassium salt of 2,6-di-tert.-butyl-4-methylphenol is dissolved in 70 ml. of dimethylformamide. To this solution is added, at room temperature, a solution of 8 g. of allyl chloride in 20 ml. of dimethylformamide, and the reaction mixture is then agitated for one hour at 30–40° and then poured into 1 l. of ice water. The thus-separated oil is taken up in petroleum ether. This solution is dried over sodium sulfate, the petroleum ether is removed by evaporation, and the remaining 2,6-di-tert.-butyl-4-methylphenylallyl ether is distilled under reduced pressure; B.P.$_{12}$ 142–144°.

Analogously, the following compounds are obtained:

2′,6′-di-tert.-butyl-4′-methylphenyl-2,3-epoxypropyl ether, M.P. 82–83°;
2,6-di-tert.-butyl-4-methylphenyldodecyl ether, B.P.$_{15}$ 245–250°;
2′,6′-di-tert.-butyl-4′-methylphenyl-3,6-dioxaheptyl ether, B.P.$_5$ 170–175°;
2′,6′-di-tert.-butyl-4′-methylphenyl-2-oxadecyl ether, B.P.$_4$ 190°;
2′,6′-di-tert.-butyl-4′-methylphenyl-2-hydroxy-4,7,10-trioxadodecyl ether, B.P.$_4$ 230°;
2′,6′-di-tert.-butyl-4′-methylphenyl-2-hydroxy-4-oxahexadecyl ether, B.P.$_4$ 263°;
2,6-di-tert.-butyl-4-methylphenylbenzyl ether, B.P.$_4$ 140–145°;
2,6-di-tert.-butyl-4-methylphenyl-p-methoxybenzyl ether, B.P.$_5$ 188–193°;
bis-(4-methoxy-3,5-di-tert.-butylphenyl)-methane, M.P. 157–158°;
2′,6′-di-tert.-butyl-4′-methylphenyl-6-(o,o-di-tert.-butyl-p-methylphenoxy)-hexyl ether, M.P. 121–123°;
2′,6′-di-tert.-butyl-4′-methylphenyl-2-hydroxy-3-(o,o-dimethylphenoxy)-propyl ether, M.P. 120–121°;
2′,6′-di-tert.-butyl-4′-methylphenyl-4,4-dimethyl-3-oxa-2-oxopentyl ether, M.P. 91–92°;
2,6-di-tert.-butyl-4-(2′-cyanoethyl)-anisole, M.P. 92–94°;
2,6-di-tert.-butyl-4-(2′-carbamoylethyl)-anisole, M.P. 134–136°;
2,6-di-tert.-butyl-4-(2′-carbomethoxyethyl)-anisole, B.P.$_{12}$ 155–158°;
2,6-di-tert.-butyl-4-(2′-carboctadecyloxyethyl)-anisole, M.P. 38–39°;
4-methoxy-3,5-di-tert.-butylacetophenone, M.P. 47–49°;
4-methoxy-3,5-di-tert.-butylacetophenone-thiosemicarbazone, M.P. 96–98°;
4-methoxy-3,5-di-tert.-butylphenyl-tert.-butyl ketone, M.P. 70–72°;
4-methoxy-3,5-di-tert.-butylphenyl-heptadecyl ketone, B.P.$_{11}$ 300–305°;
4-methoxy-3,5-di-tert.-butylphenyl-pentadien-(1,3)-yl ketone, M.P. 88–90°;
4-methoxy-3,5-di-tert.-butylbenzophenone, B.P.$_{11}$ 220–225°.

Example 3

25.8 g. of the potassium salt of 2,6-di-tert.-butyl-4-methylphenol is dissolved in 50 ml. of diethylene glycol dimethyl ether and mixed dropwise with 10 ml. of acetyl chloride at 10° under agitation and cooling. This mixture is stirred for 1½ hours at room temperature and then poured into ice water. The oil which is thus separated is taken up in petroleum ether; the solution is dried over sodium sulfate and evaporated. The remaining 2,6-di-tert.-butyl-4-methylphenyl ester of acetic acid is distilled under reduced pressure; B.P.$_{12}$ 150–153°.

Analogously, the following compounds are obtained:

2,6-di-tert.-butyl-4-ethylphenyl ester of acetic acid, M.P. 41–42°;
2,6-di-tert.-butyl-4-n-propylphenyl ester of acetic acid, M.P. 70–71°;

oils and greases, and cooling oils and insulating oils. For other examples, see, e.g., "Bailey's Industrial Oils and Fat Products," Karl F. Mattil et al., Interscience Pub. (1951).

The stabilizing agents of this invention can contain, in addition to one or more compounds of Formula I, other conventional stabilizers, e.g., visible and ultraviolet light stabilizers.

The agents of this invention are distributed uniformly in the polymer, fat or oil being stabilized in amounts of 0.01 to 10% by weight, preferably 0.01 to 3% by weight, the exact amount depending in part on the type of the materials to be stabilized and the selected stabilizer. The optional amount can readily be determined by conventional testing procedures.

The stabilizing effect of the effective agents of the substances of this invention was determined as follows:

Non-stabilized polyethylene powder was kneaded together with 0.5% by weight of the stabilization agent to be evaluated in a mixing roll mill for one hour at 140–150° C. in the presence of air. The powder was then pressed at this temperature and under a pressure of 100 kp./cm.² into sheets of a thickness of 2 mm. From these sheets, test bodies 10 x 50 mm. in size were cut and the elongation at rupture (in percent) thereof was determined by a conventional tensile strength testing machine. The results are compiled in Table I. The comparison substance employed was the commercially available stabilizer 2,6-di-tert.-butyl-4-methylphenol (Experiment No. 2).

TABLE I.—ELONGATION AT RUPTURE OF TEST BODIES OF POLYETHYLENE WITH VARIOUS STABILIZING ADDITIVES

| Experiment No. | Stabilizer | Elongation at rupture in percent |
| --- | --- | --- |
| 1 | None (control) | 60 |
| 2 | 2,6-di-tert.-butyl-4-methylphenol | 290 |
| 3 | 2,6-di-tert.-butylanisole | 400 |
| 4 | 2,6-di-tert.-butyl-4-methylanisole | 330 |
| 5 | 2,6-di-tert.-butyl-4-octadecylanisole | 400 |
| 6 | 2,6-di-tert.-butyl-4-methylphenetole | 330 |
| 7 | 2′,6′-di-tert.-butyl-4′-methylphenyl-2,3-epoxypropyl ether | 400 |
| 8 | 2,6-di-tert.-butyl-4-octadecylphenyl ester of acetic acid | 330 |
| 9 | Methyl ester of β-(4-acetoxy-3,5-di-tert.-butyl phenyl)-propionic acid | 330 |
| 10 | 4-acetoxy-3,5-di-tert.-butylacetophenone | 350 |
| 11 | 2,6-di-tert.-butyl-4-methylphenyl ester of cinnamic acid | 330 |
| 12 | 2,6-di-tert.-butyl-4-methylphenyl ester of p-methoxycinnamic acid | 400 |

The data in Table I show that the test bodies stabilized with the compounds of this invention can be subjected, after thermal stress (during incorporation therein and pressing into sheets) to a markedly higher mechanical load than those stabilized with 2,6-di-tert.-butyl-4-methylphenol.

A further advantage of the compounds of this invention is that they are more readily soluble in the plastics, oils and fats to be stabilized compared to the corresponding phenolic stabilizers. This property is important, especially cases wherein the materials to be stabilized are thermally sensitive and thus cannot be heated in order to obtain a sufficient stabilizer concentration within a reasonable period of time when solubility characteristics are poor. The solubility data for several phenols, phenol ethers, and phenol esters are compiled in Table II.

TABLE II.—SOLUBILITY OF STABILIZING AGENTS IN PEANUT OIL

| Experiment No. | Stabilizing agent | Solubility (g./100 g. peanut oil) |
| --- | --- | --- |
| 1 | 2,6-di-tert.-butyl-4-methylphenol | 8 |
| 2 | 2,6-di-tert.-butyl-4-methylanisole | ∞ |
| 3 | 2,6-di-tert.-butyl-4-octadecylphenol | 10 |
| 4 | 2,6-di-tert.-butyl-4-octadecylanisole | ∞ |
| 5 | 2,6-di-tert.-butyl-4-methylphenyl ester of cinnamic acid | 48.7 |

The data in Table II demonstrate that the phenol ethers and phenol esters of this invention are noticeably better soluble than the corresponding phenols. A preferred aspect of this invention is the use of a compound of Formula I which is soluble to the extent of at least 0.5, preferably at least 5 g./100 g. of polymer, fat or oil being stabilized therewith.

Finally, the stabilizing agent based on the phenol ethers and phenol esters exhibit the further advantage that they can be adapted without difficulties to the chemical composition of the material to be stabilized. Thus, it is possible, for the stabilization of polyolefins, to employ phenol ethers or esters having long-chain aliphatic substituents; for halogenated polyolefins, such as, for example, polyvinyl chloride, those with halogen-substituted chains can be employed; for polyethers, phenol ethers having side chains containing epoxy groups or further ether bonds; for polyesters or ester-containing fats or oils, phenol esters which can optionally contain additional ester groups in the side chain or chains; and for polyamides, those having acid amide groups; etc.

Thus, a preferred aspect of this invention is the stabilization of a polymer, fat or oil as defined herein with a compound of Formula I wherein one or both of R₁ and R₂ is a group which functionally corresponds to the polymer, fat or oil stabilized therewith. Additionally, functional groups present in stabilizers conventionally used with a specific polymer, fat or oil can be incorporated into R₁ and/or R₂, e.g., epoxide groups for stabilizers of polyvinyl chloride, an Fe salt of carbocyclic acid for stabilization of silicones, an arylamino, e.g., anilino, group for stabilization of rubbers, a thio or thione group for polyolefins, etc.

The novel compounds (II) of this invention can be produced by conventional processes. In the preferred process, an alkali salt of 2,6-di-tert.-butyl-4-(R₄)-phenol is reacted with an alkyl or acyl derivative containing the desired residue R₁. Preferably, the corresponding alkyl halogenides, alkyl or dialkyl sulfates, acyl halogenides, acid anhydrides, or acid esters are employed. Suitable solvents for these reactions are those which are inert with respect to the starting materials under the reaction conditions. Preferred are the hydrocarbons, e.g., benzene, toluene, xylene, tetrahydronaphthalene, and decahydronaphthalene. Others are ethers, e.g., diethyl ether, tetrahydrofuran, dioxane, and preferably diethers of polyglycols, e.g., diethylene glycol dimethyl ether. Other suitable solvents are dimethylformamide, dimethyl sulfoxide, ketones, e.g., acetone, methyl ethyl ketone, or diethyl ketone, and carboxylic acid esters, e.g., ethyl acetate or butyl acetate. The reaction temperature can range between —50° C. and +150° C., preferably between —10° C. and +60° C. The reaction mixture is worked up in the usual manner, for example by pouring the reaction mass into water and extracting the reaction product with a suitable solvent, such as petroleum ether, benzene or ether.

In an alternate process, the novel compounds (II) are obtained by reacting in the presence of a Lewis acid, phenol ethers or esters of the Formulae III and IV, respectively:

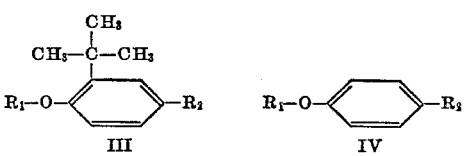

wherein R₁ and R₂ have the same meanings as for the reaction products (II), with a compound from which a tert.-butyl carbonium ion is formed under these conditions. Such compounds are, for example, tert.-butanol, tert.-butyl halogenides, or other reactive esters of tert.-butanol, such as, for example, the tert.-butyl ester of p-toluenesul- 2,4,6-tri-tert.-butylphenyl ester of acetic acid, M.P. 106–108°;
2,6-di-tert.-butyl-4-n-octylphenyl ester of acetic acid, B.P.₄ 188–191°;
2,6-di-tert.-butyl-4-octadecylphenyl ester of acetic acid, B.P.₅ 268–270°;
2,6-di-tert.-butyl-4-(2'-cyanoethyl)-phenyl ester of acetic acid, M.P. 107–109°;
2,6-di-tert.-butyl-4-(2'-carbomethoxyethyl)-phenyl ester of acetic acid, B.P.₁₂ 205–207°;
2,6-di-tert.-butyl-4-(2'-carboctadecyloxyethyl)-phenyl ester of acetic acid, M.P. 46–48°;
3,5-di-tert.-butyl-4-acetoxyacetophenone, M.P. 92–94°;
3,5-di-tert.-butyl-4-acetoxyphenyl-tert.-butyl ketone, M.P. 84–86°;
3,5-di-tert.-butyl-4-acetoxyphenylheptyl ketone, B.P.₁₀ 234–236°;
3,5-di-tert.-butyl-4-acetoxyphenylheptadecyl ketone, B.P.₁₁ 305–308°;
2,6-di-tert.-butyl-4-methylphenyl ester of isovaleric acid, B.P.₁₂ 163–173°;
2,6-di-tert.-butyl-4-methylphenyl ester of caprylic acid, B.P.₁₁ 204–208°;
2,6-di-tert.-butyl-4-methylphenyl ester of stearic acid, B.P.₁₂ 200–210°;
2,6-di-tert.-butyl-4-methylphenyl ester of acrylic acid, B.P.₁₂ 155–160°;
2,6-di-tert.-butyl-4-methylphenyl ester of crotonic acid, B.P.₁₂ 160–180°;
2',6'-di-tert.-butyl-4'-methylphenyl ester of 3-oxa-butane-1-carboxylic acid, M.P. 44–46°;
2',6'-di-tert.-butyl-4'-methylphenyl ester of 3-oxa-undecane-1-carboxylic acid, B.P.₅ 220–225°;
2',6'-di-tert.-butyl-4'-methylphenyl ester of 3-thia-pentadecane-1-carboxylic acid, B.P.₅ 272–278°;
2',6'-di-tert.-butyl-4'-methylphenyl ester of 3-thia-6-oxo-7-oxaoctane-1-carboxylic acid, B.P.₅ 222–225°;
2',6'-di-tert.-butyl-4'-methylphenyl ester of 3-thia-6-oxo-7-oxa-9-methyldecane-1-carboxylic acid, B.P.₅ 243°;
2,6-di-tert.-butyl-4-methylphenyl ester of benzoic acid, M.P. 138–140°;
2,6-di-tert.-butyl-4-methylphenyl ester of cinnamic acid, M.P. 117–124°;
di-tert.-butyl-4-methylphenyl ester of p-methoxycinnamic acid, M.P. 141–143°;
2,6-di-tert.-butyl-4-methylphenyl ester of p-methoxy-m,m-di-tert.-butylphenylpropionic acid, M.P. 142–145°;
bis-(4-acetoxy-3,5-di-tert.-butylphenyl)-methane, M.P. 133–135°;
1,4-bis-(2',6'-di-tert.-butyl-4'-methylphenoxycarbonyl)-n-butane, M.P. 170–174°;
1,3-bis-(2',6'-di-tert.-butyl-4'-methylphenoxycarbonyl)-2-thiapropane, M.P. 121–123°.

Example 4

Isobutene is introduced into a solution, mixed with 0.5 ml. of concentrated sulfuric acid, of 55 g. of 4-dodecylanisole in 240 ml. of petroleum ether (boiling range 90–110°) at such a speed that the reaction temperature remains between 60 and 70°. After the absorption of 10 l. of isobutene, the reaction mixture is shaken with respectively 100 ml. of aqueous sodium bicarbonate solution and water, dried over sodium sulfate, and distilled, after removal of the petroleum ether, under reduced pressure. The fraction passing over at 218–225°/5 mm. Hg is 2,6-di-tert.-butyl-4-dodecylanisole.

Example 5

At 5–10°, 30 g. of aluminum chloride is added to a solution of 50 g. of 2,6-di-tert.-butylacetoxybenzene in 300 ml. of well-dried 1,2-dichloroethane; thereafter, under thorough agitation and under cooling, 21 g. of acetic acid anhydride in 50 ml. of 1,2-dichloroethane is added dropwise in such a manner that the temperature does not rise above 25°. Subsequently, the reaction mixture is stirred for another ½ hour, poured into 1 l. of ice water, and concentrated hydrochloric acid is added dropwise under agitation until the separated aluminum hydroxide is again dissolved. The organic phase is separated, and the aqueous solution is shaken out with 100 ml. of 1,2-dichloroethane. The combined organic phases are washed neutral with aqueous sodium bicarbonate solution, dried over sodium sulfate, and evaporated. The thus-remaining 3,5-di-tert.-butyl-4-acetoxyacetophenone is recrystallized from benzene; M.P. 93–94°.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A stabilized composition of a polymer normally susceptible to at least one of thermal and oxidative degradation in an unstabilized state and selected from the group consisting of polyolefins, polystyrenes, polyamides, polyesters, polyacetals, polyvinyl chloride, polyethers and natural synthetic rubbers, stabilized by the presence of a stabilizing amount of at least one compound of the formula

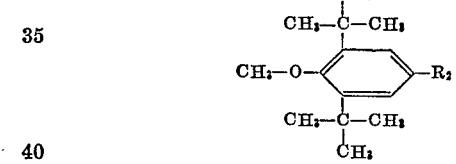

wherein R is selected from the group consisting of H, alkyl or 1 to 22 carbon atoms and alkenyl of 1 to 22 carbon atoms.

2. A composition according to claim 1 wherein the stabilizer is 2,6-di-tert.-butyl-4-octadecylanisole.

3. A composition according to claim 1 wherein the stabilized polymer is a polyolefin.

4. A composition according to claim 1 wherein the stabilized polymer is a polyethylene.

5. A composition as defined in claim 1 wherein R is an alkyl radical of 1 to 22 carbon atoms.

6. A composition as defined in claim 1 wherein R is an alkylene radical of 1 to 22 carbon atoms.

7. A composition as defined by claim 1 wherein R is H.

8. A composition as defined by claim 1 wherein R is methyl.

9. A composition as defined in claim 1 wherein R is ethyl.

10. A composition as defined in claim 1 wherein R is n-propyl.

11. A composition as defined by claim 1 wherein R is tertiary butyl.

12. A composition as defined by claim 1 wherein R is n-octyl.

13. A composition as defined in claim 1 wherein R is dodecyl.

14. A composition as defined in claim 1 wherein R is allyl.

15. A composition according to claim 1 wherein the material subject to degradation is a synthetic rubber or a natural rubber.

(References on following page)

References Cited

UNITED STATES PATENTS

| | | | |
|---|---|---|---|
| 2,926,092 | 2/1960 | Dugan et al. | 252—407 |
| 3,196,185 | 7/1965 | Ranson | 260—45.95 |
| 2,362,516 | 11/1944 | Wasson et al. | 252—52 |
| 2,657,983 | 11/1953 | Hill et al. | 44—78 |
| 3,347,677 | 10/1967 | Jaworski et al. | 260—45.8 |

DONALD E. CZAJA, Primary Examiner

V. P. HOKE, Assistant Examiner

U.S. Cl. X.R.

44—70, 78; 99—163; 252—48.2, 48.6, 47.5, 51.5, 52, 57; 260—45.8 A, 45.85 R, 45.85 E, T, S, 45.9 R, 45.95 H, 342.3, 347.4, 347.8, 348 R, A 479 R, 479 S, 520, 592, 552 S C, 591, 612 D